United States Patent [19]

Henderson et al.

[11] Patent Number: 4,741,797

[45] Date of Patent: May 3, 1988

[54] APPARATUS FOR APPLYING SURFACING SHEETS TO SUPPORT SURFACES THEREFOR

[75] Inventors: Pieter M. Henderson, Bedfordview; Karl-Heinz Schmitt, Benoni, both of South Africa

[73] Assignee: Heinrich Brandt Maschinenbau-GmbH, Lemgo, Fed. Rep. of Germany

[21] Appl. No.: 814,689

[22] Filed: Dec. 30, 1985

[30] Foreign Application Priority Data

Dec. 28, 1984 [ZA] South Africa .................. 84/10107

[51] Int. Cl.⁴ .................. B32B 3/04; B32B 31/00
[52] U.S. Cl. .................. 156/479; 156/489; 156/492; 156/497
[58] Field of Search .......... 156/216, 479, 480, 492, 156/475, 497, 285, 444, 443, 448, 478, 460, 469, 489, 391

[56] References Cited

U.S. PATENT DOCUMENTS

| | | | |
|---|---|---|---|
| 2,937,689 | 5/1960 | Peterson | 156/479 |
| 4,035,224 | 7/1977 | Anderson | 156/216 |
| 4,123,311 | 10/1978 | McAlpine | 156/443 |
| 4,220,491 | 9/1980 | Metcalf et al. | 156/285 |
| 4,406,729 | 9/1983 | Elias | 156/481 |
| 4,478,664 | 10/1984 | Elias | 156/492 |
| 4,512,837 | 4/1985 | Sarh et al. | 156/458 |
| 4,530,729 | 7/1985 | Fuchs et al. | 156/443 |
| 4,539,005 | 9/1985 | Schmitt | 156/475 |
| 4,539,066 | 9/1985 | Henderson et al. | 156/479 |
| 4,563,233 | 1/1986 | Henderson | 156/479 |

Primary Examiner—Donald E. Czaja
Assistant Examiner—Louis Falasco
Attorney, Agent, or Firm—Finnegan, Henderson, Farabow, Garrett & Dunner

[57] ABSTRACT

Apparatus is provided in which a support table and clamp arrangement serve to hold a panel in position while a surfacing sheet already applied to the major face of such panel, is applied around radiused edges of the panel. The apparatus includes a turntable to support a panel in raised position relative to the support table when the turntable is being rotated to enable successive edges of the panel to be presented to the apparatus without removing a panel from the turntable. The turntable can be located on a carrier movable laterally towards and away from the clamping arrangement.

8 Claims, 4 Drawing Sheets

APPARATUS FOR APPLYING SURFACING SHEETS TO SUPPORT SURFACES THEREFOR

FIELD OF THE INVENTION

This invention relates to apparatus for applying surfacing sheets to support surfaces therefor, and more particularly, major surfaces of doors, desks or table tops, other flat panels, as well as surfaces of other articles in all of which cases the surfacing sheet is formed around a radiused edge adjoining the support surface.

BACKGROUND TO THE INVENTION

In order to apply a surfacing sheet, usually to a flat panel and around a radiused edge thereof, the surfacing sheet is firstly applied to a major flat face in conventional manner, and thereafter the panel is clamped in apparatus of the general nature with which this invention is concerned. Urging means such as an applicator bar or length of angle iron is then moved to bend the surfacing sheet around the radiused edge and simultaneously effect bonding of the sheet to the panel edge.

In many cases such bonding is effected by the application of heat by way of the applicator bar or the like and apparatus of this general nature is fully described in South African Patent Application No. 84/3228 filed May 1, 1984.

Such apparatus generally has a fixed, although optionally adjustable support table, for supporting at least the edge region of a panel which is clamped, by means of a suitable clamping arrangement, to the table prior to operation of the applicator bar or the like. Where two, three or more edges of the same panel are to be covered with surfacing material in like manner, the panel is generally manhandled from a position in which one edge is operatively presented to the apparatus, to positions in which other edges are thus presented.

It is the object of this invention to provide improved apparatus in which presentation of an edge to be treated in such apparatus is greatly facilitated, particularly where a plurality of edges, in particular but not exclusively, edges defining the entire periphery of a panel, are to be provided with surfacing sheet material extending around radiused edges thereof.

SUMMARY OF THE INVENTION

In accordance with this invention there is provided apparatus for applying surfacing sheet materials to surfaces of panels or the like said apparatus comprising a support table and co-operating clamp arrangement therefor; means for urging a sheet of surfacing material around a radiused edge of a panel clamped by the table and clamp arrangement; a rotatable turntable arranged to support a panel at a position for clamping between said support table and clamp arrangement and to rotate same between selected angular positions substantially in the plane of the panel, and means for releasing said support table and said clamping arrangement from a panel supported on the turntable for rotation of the latter.

Preferred embodiments of the invention provide for the turntable to be vertically movable in order to define said means for spacing a panel supported thereby from the support table, for the turntable to be biased to a raised position in which a panel supported thereon is spaced from the support table in which case the clamp arrangement simply urges it downwardly against such biasing in clamping a panel to the support table; for the turntable to have upstanding locating pins or other suitable formations for co-operation with co-operating formations provided in a panel or the like, or alternatively, to be formed into a dished suction member whereby a panel is held thereon by a decreased pressure between the panel and turntable when required; for the turntable to be movable towards and away from said support table and co-operating clamp assembly; for the support table to have a series of removable spacer members extending along the length thereof to provide for selective removal of spacer members at locations where glue or adhesive carrying edges of panels will be located in use, and for one or more glue applicator supports to be mounted on guide rails therefor for reciprocal movement at adjustable locations for applying glue to an edge of a panel operatively located within the apparatus.

A further preferred embodiment of the invention may provide for an indexing arrangement to be associated with the turntable for holding or stopping the turntable in predetermined angular positions thereof.

In order that the invention may be more fully understood different proposed embodiments thereof will now be described by way of example with reference to the accompanying drawings.

DETAILED DESCRIPTION WITH REFERENCE TO THE DRAWINGS

Figure 1:
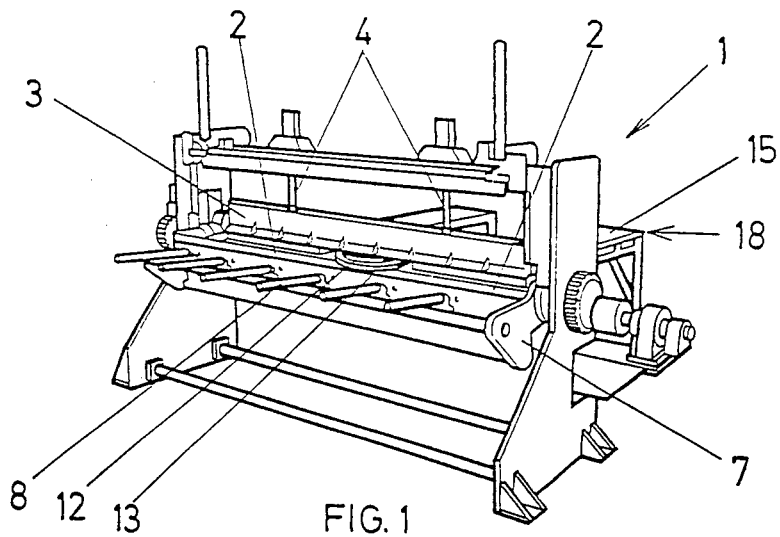
FIG. 1 is a perspective view of apparatus of the invention from the side thereof on which the applicator bar is located.
Figure 2:
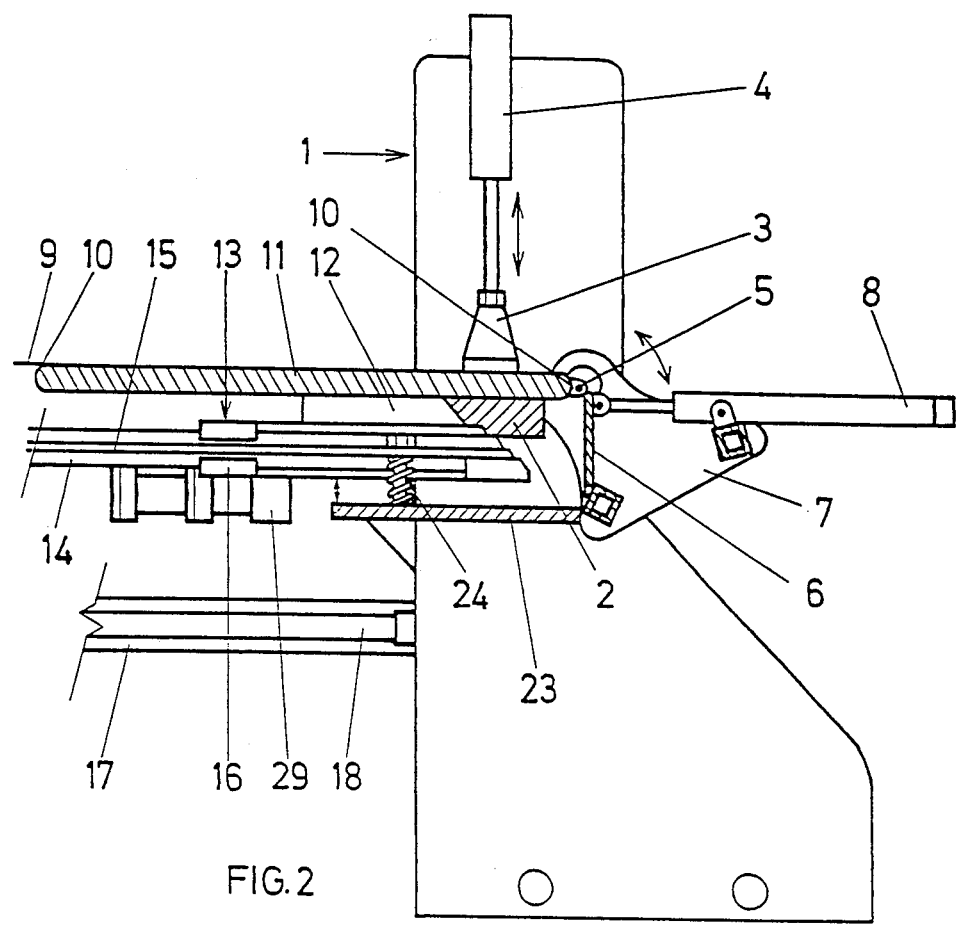
FIG. 2 is a partly sectioned side elevation thereof.
Figure 3:
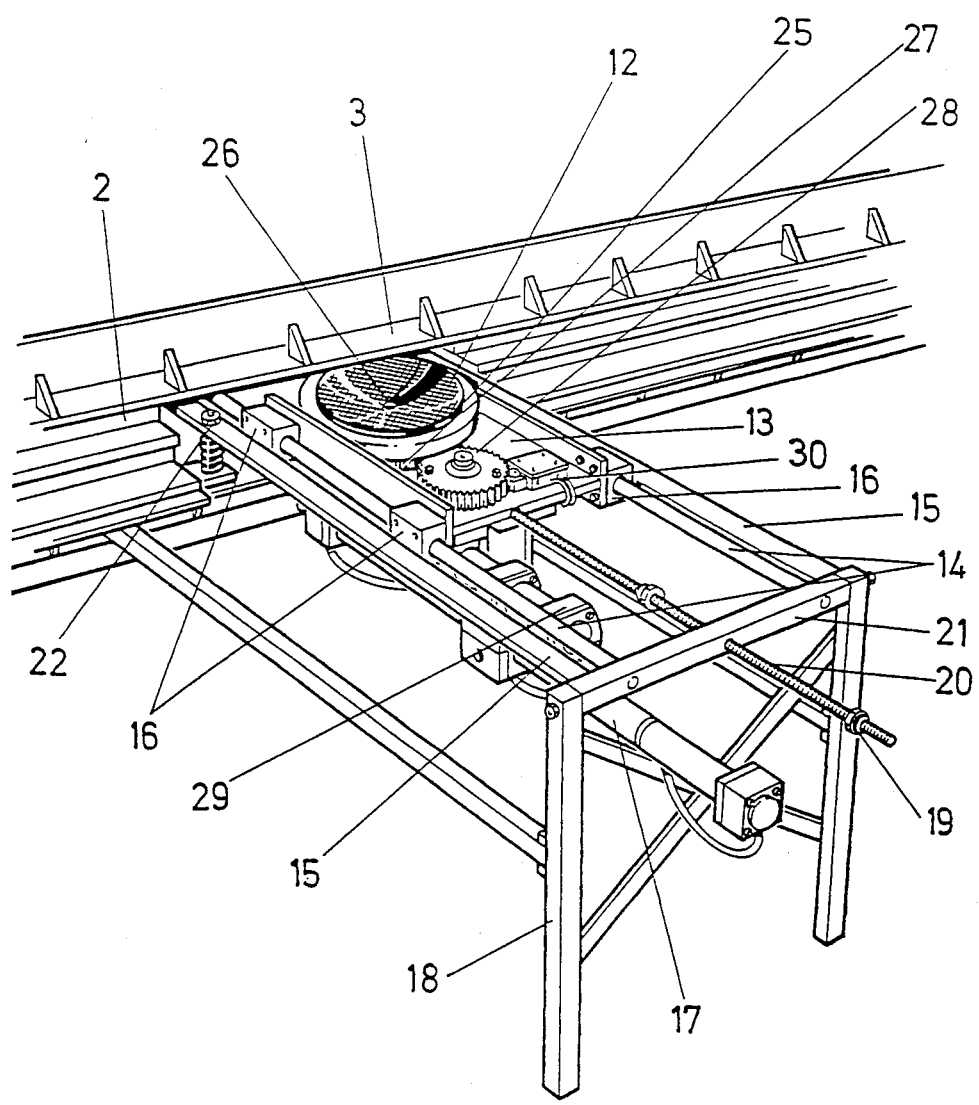
FIG. 3 is a perspective view of the turntable arrangement from the side of the apparatus opposite the applicator bar.
Figure 4:
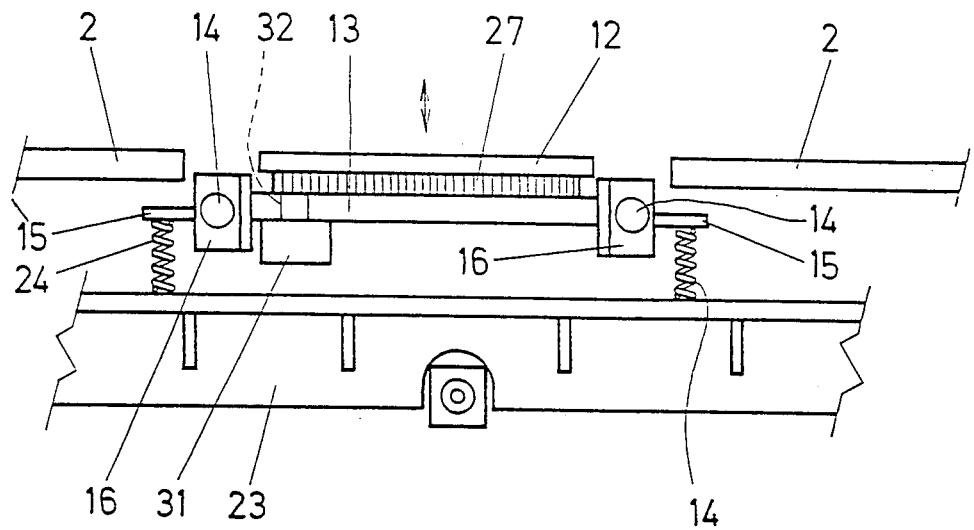
FIG. 4 is a front end view of the turntable and carrier therefor.

In a first embodiment of the invention illustrated in FIGS. 1 to 4, the apparatus comprises a frame, generally indicated by the numeral 1, which supports a support table 2 and, above it, a clamping member 3 operable by means of pneumatic piston and cylinder assemblies 4.

Along one edge of the table 2 is an applicator bar 5 (see FIG. 2) mounted on arms 6 carried by rotatable supports 7 therefor so that, by means of biasing pneumatic piston and cylinder assemblies 8, the bar and arms which support it (which are pivotally mounted at their ends opposite the applicator bar) can be urged to maintain the applicator bar in firm contact with sheet material 9 being applied to the radiused edge 10 of a panel 11 along the entire length of the applicator bar in use. The applicator bar may be heated, for example by a resistance heating element (not shown). More detailed of this type of apparatus can be obtained from said South African Patent Application No. 84/3228.

A turntable 12 on a carrier 13 therefor is movable on transverse guides 14 in a direction at right angles to the length of the clamping member 3 between an inner position in which it is located at least partially under the clamping member and outer positions in which it is removed therefrom. The guides are conveniently circular in cross-section and have outwardly directed frame members 15 supporting them. The carrier itself is supported on the guides by slide blocks 16 fixed to the carrier.

The turntable and carrier are movable along the guides by means of a piston and cylinder assembly 17 supported by suitable framework 18 at the end thereof remote from the clamping member and the limits of movement of the carrier are determined by adjustable stops 19 positioned on a rod 20 movable in unison with the carrier. The stops 19 co-operate with a frame member 21 at said end remote from the clamping member. Conveniently the stops are simple nut arrangements and the rod is a screw-threaded one.

In order to enable the turntable to lift a panel which is supported thereon, in use, so that it is clear of the support table, the ends 22 of the outwardly directed frame members 15 are supported by a part 23 of the main frame of the machine through compression springs 24. The compression springs bias the whole carrier and guide assembly to a raised position such that, with the clamping member out of contact with the support table 2, any panel supported on the turntable is raised relative to such support table. Clamping, when it is effected, will automatically force the turntable downwardly against the biasing of the springs so that the panel becomes clamped firmly between the table 2 and the clamping member 3. It will be understood, as shown most clearly in FIG. 4, the turntable and carrier are located in a gap in the length of the support table.

It is, in addition, preferred that the turntable be of circular shape and have a seal ring 25 around its periphery, and a dished configuration such that a central hole 26 for the application of a vacuum, can be employed to anchor a panel to the turntable by means of such vacuum as required.

For effecting rotation of the turntable 12 there is provided, immediately beneath the turntable, a concentric gear wheel 27 which meshes with a drive gear 28 also positioned on the carrier and driven through a pneumatic motor and gear box assembly generally indicated by numeral 29. The gear ratio is such that the drive gear 28 rotates once for every 180° revolution of the turntable. In the most general application of the invention rectangular or square panels will be surfaced with sheet material and, accordingly, if all of the edges are to be treated by means of the applicator bar, the panel is to be rotated by 90° at a time. A micro switch arrangement indicated by numeral 30 co-operates with the drive gear 28 to sense every 180° of revolution thereof which corresponds to 90° of revolution of the turntable. The micro switch is connected to activate a pneumatically operated piston and cylinder assembly indicated by numeral 31 in FIG. 4 which urges a locking pin (shown in dotted lines 32) into co-operation with holes in the concentric gear 27 to ensure that the turntable is rotated through exactly the required 90° angle thereby constituting an indexing arrangement. The micro switch activates the pneumatic piston and cylinder 31 together with its locking pin a short distance before the full 180° revolution of the drive gear has been achieved and, accordingly, the locking pin is urged towards the gear wheel 27 such that it is stopped at exactly the correct position by the locking pin snapping into co-operating location with the required hole.

It will, accordingly, be understood that a panel can easily be located on the turntable with one of its edges in a desired orientation ready for application of a surfacing sheet around a radiused edge thereof. The surfacing sheet will, in the usual way, and as indicated above, already have been pressed on to the major surface of the panel.

The suction can then be operated in order to hold the panel on the turntable and the first edge can be applied by means of the applicator bar.

When the clamping member is released the panel is raised by virtue of the action of the compression springs 24 and the pneumatic motor 29 is automatically activated and the turntable rotated. If required the piston and cylinder assembly 17 (which is also pneumatic in nature) which controls the movement of the carrier, is activated as necessary and the travel of the carrier is arrested by engagement of the stops 19 with the frame member 21 through which the rod 20 carrying the stops passes. Activation of the pneumatic motor 29 rotates the drive gear through 180° and activation of the micro switch arrangement 30 ensures that the locking pin is engaged in the appropriate hole after the gear wheel 27 has been rotated through its required angle of movement.

It will be understood that the engagement of the stops 19 on the rod 20 with the frame member 21 can cause a jarring action unless they are suitably damped but, in place of damping, an alternative arrangement is also envisaged within the scope of this invention.

Figure 5:
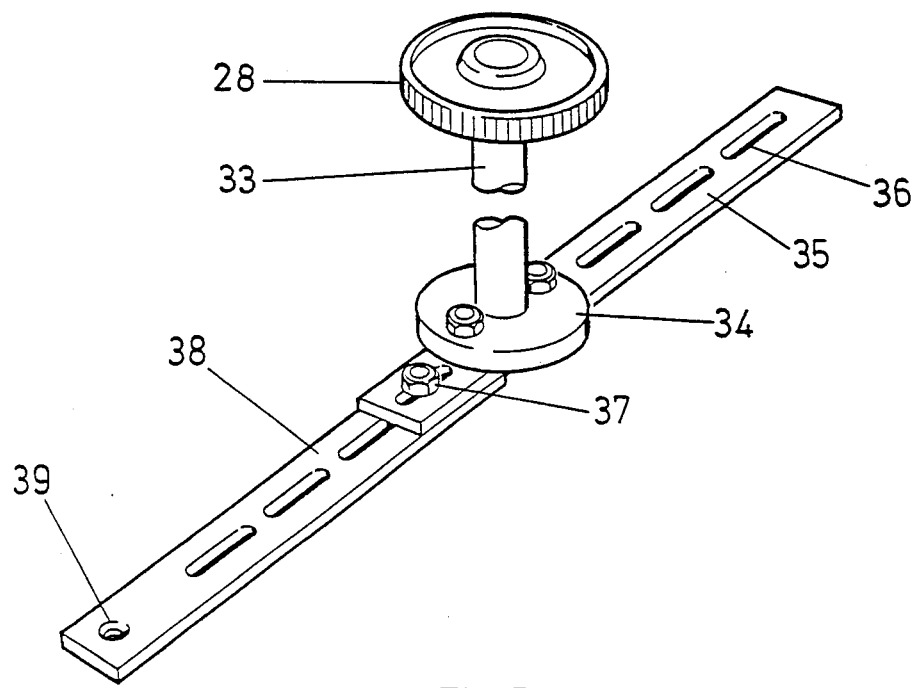
FIG. 5 illustrates in isometric view an alternative mechanism for moving the turntable and carrier therefor; and, FIG. 6 is a schematic isometric view illustrating some further variations of the apparatus described.

Referring particularly to FIG. 5, there is illustrated the drive gear 28 rotatable in unison with a drive shaft 33 and a plate 34. The plate 34 has bolted thereto a longitudinally adjustable crank bar 35 adapted to be pivoted at its free end 36 to the frame of the apparatus and to which is adjustably pivotally attached, by means of a pivot 37, a further crank bar 38 pivotally attached at its other end 39 to the carrier member. By suitably adjusting the positions of the pivots and the position of attachment of the first crank member 35 to the plate 34, the exact distance of movement of the carrier can be set for any rectangular panels which may be treated in the apparatus. Thus rotation of the drive gear 28 will automatically adjust the position of the turntable for location of the appropriate edge of the panel for application of the surfacing sheet thereto.

Figure 6:
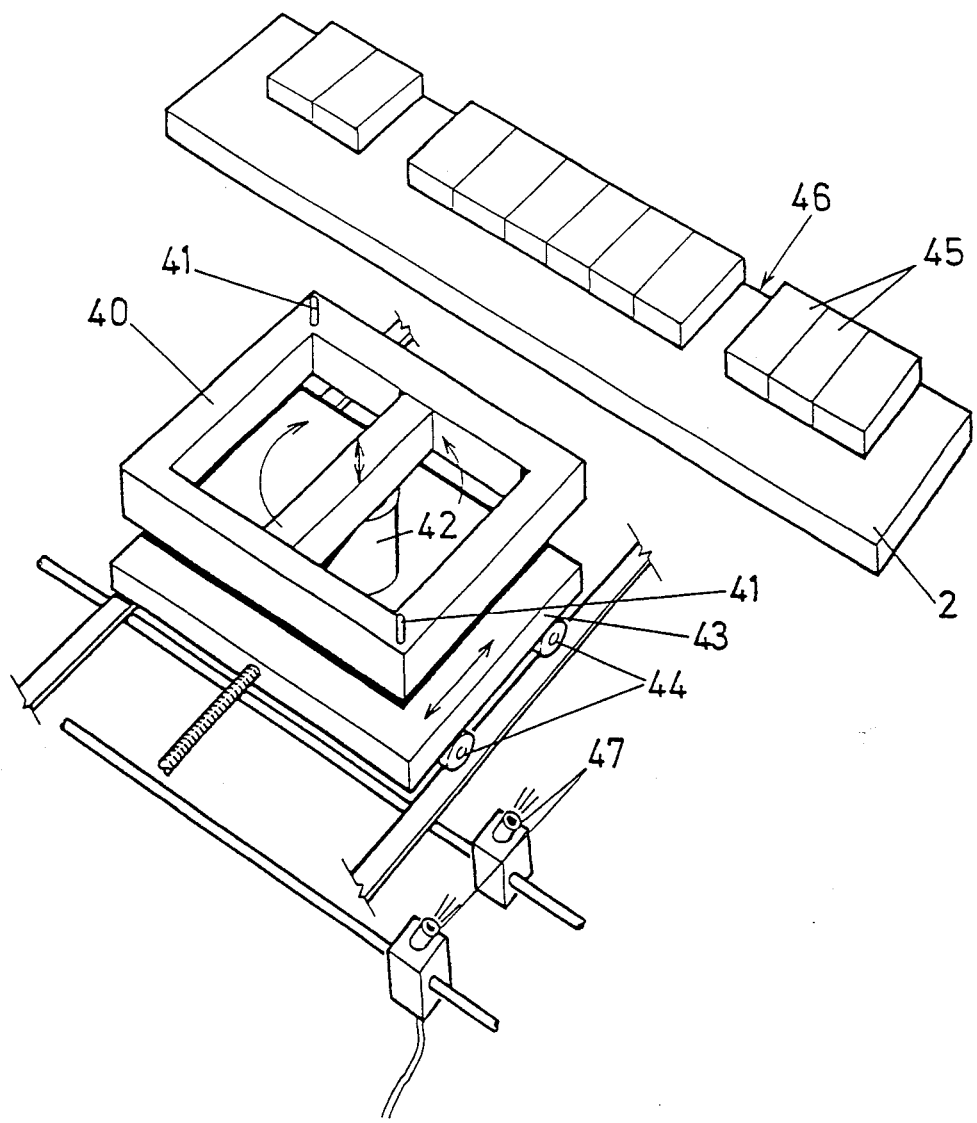

Many other variations may be made to the invention without departing from the scope hereof and, in particular, some modifications are illustrated in FIG. 6.

Thus, for example, the turntable could be a simple rectangular frame 40 and could have simple pins 41 for locating panels thereon in predetermined positions. The lifting of the turntable could be effected by way of a pneumatic or hydraulic piston and cylinder assembly 42 extending between the turntable and a carrier 43 therefor and the carrier 43 could be located on castors or other forms of wheels 44.

Whilst, generally speaking, the adhesives employed for application to a panel to enable surfacing sheet material to be applied thereto can be of a type which are substantially dry, and will accordingly not stick to the support table and clamp member, if adhesives are employed which do create a problem in this regard, a series of support blocks 45 could be employed to define the upper operative surface of the support table 2 and appropriate blocks could simply be removed as indicated by numeral 46, where lines of glue on panels are to be located during use of the apparatus. Indeed, it is also within the scope of this invention that glue applicator sprays 47 could be embodied in the apparatus to automatically apply adhesive to regions as required.

It will be understood that numerous variations may be made to the above described apparatus which is simply given by way of illustration of the invention.

It will be understood that, in respect of rectangular or square panels, the sheet material can be applied around all four edges which can be radiused to provide, for example, a desk top or table top. To this end the surfacing sheet material must have its corners cut to an appropriate shape being the development of the line of join of adjacent radiused edges. Whilst the edges can be left in an unfinished state, they could also be cut out and have premoulded or prefabricated inserts fixed therein in order to provide a smoother appearance of the corner.

It is envisaged that a combination apparatus as provided by this invention will be highly useful and will save substantial amounts of time generally spent in man-handling panels between different positions in which different edges thereof are presented to an apparatus for application of the surfacing sheet material thereto.

What is claimed is:

1. Apparatus for applying surfacing sheet materials to support surfaces therefor comprising:
   (a) a frame member;
   (b) a support table having a gap therein and a clamp member cooperating with said support table, both being supported by said frame;
   (c) means for urging a sheet of surfacing material around a radiused edge of a support surface clamped by said support table and said clamping member;
   (d) a rotatable turntable arranged in said gap to support a support surface thereon, said turntable being vertically movable in said gap between an upper position for spacing said support surface from said support table and a lower position permitting said support surface to be clamped by said support table and said clamping member; and
   (e) means for actuating said clamping member.

2. The apparatus of claim 1, wherein the upper surface of said turntable is dished and including suction means associated with said dished surface for holding a support surface thereon.

3. The apparatus of claim 1, including locating pins arranged on said turntable for holding a support surface thereon.

4. The apparatus of claim 1, including a movable carrier means on said frame member for supporting said turntable and arranged to permit movement towards and away from said clamp member.

5. The apparatus of claim 4, including a crank assembly pivotally attached to said frame member and said carrier means and having an adjustable throw.

6. The apparatus of claim 1, including means for biasing said turntable to said upper position and wherein said clamp member is operative to move said turntable against such biasing.

7. The apparatus of claim 1, including a motor and gear assembly for rotating said turntable.

8. The apparatus of claim 1, including indexing means for stopping or holding the rotation of said turntable in desired angular positions.

* * * * *